(12) United States Patent
Saito

(10) Patent No.: US 11,501,450 B2
(45) Date of Patent: Nov. 15, 2022

(54) OBJECT TRACKING DEVICE BY ANALYZING AN IMAGE, OBJECT TRACKING TRACKING METHOD BY ANALYZING AN IMAGE, RECORDING MEDIUM, AND OBJECT TRACKING TRACKING SYSTEM BY ANALYZING AN IMAGE

(71) Applicant: NEC Corporation, Tokyo (JP)

(72) Inventor: Shigetsu Saito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 29 days.

(21) Appl. No.: 17/059,837

(22) PCT Filed: May 30, 2019

(86) PCT No.: PCT/JP2019/021503
§ 371 (c)(1),
(2) Date: Nov. 30, 2020

(87) PCT Pub. No.: WO2019/230877
PCT Pub. Date: Dec. 5, 2019

(65) Prior Publication Data
US 2021/0225009 A1 Jul. 22, 2021

(30) Foreign Application Priority Data
Jun. 1, 2018 (JP) .............................. JP2018-106147

(51) Int. Cl.
*G06T 7/246* (2017.01)
*G06Q 30/02* (2012.01)
*H04N 7/18* (2006.01)

(52) U.S. Cl.
CPC ......... *G06T 7/246* (2017.01); *G06Q 30/0201* (2013.01); *H04N 7/183* (2013.01);
(Continued)

(58) Field of Classification Search
CPC .......... G06T 7/246; G06T 2207/10016; G06T 2207/30196; G06T 2207/30232;
(Continued)

(56) References Cited

U.S. PATENT DOCUMENTS

2008/0303662 A1* 12/2008 Sorensen ............... G06Q 30/02
340/541
2015/0029339 A1* 1/2015 Kobres .................. H04N 7/181
348/150
(Continued)

FOREIGN PATENT DOCUMENTS

JP 2000-332402 A 11/2000
JP 2010-205276 A 9/2010
(Continued)

OTHER PUBLICATIONS

Moustafa Alzantot et al., "CrowdInside: Automatic Construction of Indoor Floorplans", Proceedings of the 20th International Conference on Advances on Geographic Information Systems, 2012, pp. 99-108.
(Continued)

*Primary Examiner* — Terrell M Robinson
(74) *Attorney, Agent, or Firm* — Sughrue Mion, PLLC

(57) ABSTRACT

A tracking device according to an aspect of the present disclosure includes: a memory storing instructions; and one or more processors configured to execute the instructions to: acquire tracking information regarding a tracking indicating a movement of a person in a monitoring region; determine one or more feature points on the tracking in the monitoring region based on the tracking information; determine one or more sections of the tracking according to the feature points determined; and analyze the tracking information for each section of the tracking determined.

18 Claims, 12 Drawing Sheets

(52) U.S. Cl.
CPC .............. *G06T 2207/10016* (2013.01); *G06T 2207/30196* (2013.01); *G06T 2207/30232* (2013.01); *G06T 2207/30241* (2013.01); *G06T 2207/30242* (2013.01)

(58) Field of Classification Search
CPC ........... G06T 2207/30241; G06T 2207/30242; G06Q 30/0201; H04N 7/183
See application file for complete search history.

(56) References Cited

U.S. PATENT DOCUMENTS

2016/0132910 A1* 5/2016 Appel ................ G06Q 30/0202
705/7.31

2019/0279229 A1* 9/2019 Warita .................. G06Q 30/06

FOREIGN PATENT DOCUMENTS

| | | |
|---|---|---|
| JP | 2011-215829 A | 10/2011 |
| JP | 2015-099539 A | 5/2015 |
| JP | 2016-224621 A | 12/2016 |
| JP | 2017-118324 A | 6/2017 |

OTHER PUBLICATIONS

International Search Report of PCT/JP2019/021503 dated Aug. 13, 2019 [PCT/ISA/210].
Written Opinion of PCT/JP2019/021503 dated Aug. 13, 2019 [PCT/ISA/237].
Japanese Office Action of JP2018-106147 dated Jun. 25, 2019.

* cited by examiner

OBJECT TRACKING DEVICE BY ANALYZING AN IMAGE, OBJECT TRACKING TRACKING METHOD BY ANALYZING AN IMAGE, RECORDING MEDIUM, AND OBJECT TRACKING TRACKING SYSTEM BY ANALYZING AN IMAGE

CROSS REFERENCE TO RELATED APPLICATIONS

This application is a National Stage of International Application No. PCT/JP2019/021503 filed on May 30, 2019, claiming priority based on Japanese Patent Application No. 2018-106147 filed on Jun. 1, 2018.

TECHNICAL FIELD

The present disclosure relates to a tracking device, a tracking method, a recording medium, and a tracking system, and for example, relates to a tracking device that analyzes a traffic line of a person included in a moving image.

BACKGROUND ART

In stores such as convenience stores and drugstores, monitoring cameras are provided in general. A system using a video captured by the camera has been developed.

A system that tracks a traffic line of a person in a store, generates tracking information of the person, and outputs the generated information on the basis of a video. A user, for example, a store clerk uses the tracking information output by the system, for example, to improve a goods display method in the store.

Tracking information of a person is acquired by using various existing units. In the related art, for example, units for detecting or recognizing a person from a video, units using tag information, units using an infrared laser, or the like are adopted.

SUMMARY

Technical Problem

In the related art including the above technologies, the user needs to determine a point to be focused or a monitoring area referring to layout information of the store and to manually perform pre-setting for tracking. However, this method has a problem in that a lot of setup work is required.

Solution to Problem

An object of the some non-limiting embodiments is to provide a system or the like that can facilitate pre-setting for tracking.

A tracking device according to one aspect of the some non-limiting embodiments includes acquisition unit for acquiring tracking information regarding a tracking indicating a movement of a person in a monitoring region, feature point determination unit for determining at least one or more feature points on the tracking in the monitoring region based on the tracking information, section determination unit for determining a section of the tracking according to the feature points determined by the feature point determination unit, and analysis unit for analyzing the tracking information for each section determined by the section determination unit.

A tracking method according to one aspect of the some non-limiting embodiments includes acquiring tracking information regarding a tracking indicating a movement of a person in a monitoring region, determining at least one or more feature points on the tracking in the monitoring region based on the tracking information, determining a section of the tracking according to the determined feature points, and analyzing the tracking information for each determined section.

A recording medium according to one aspect of the some non-limiting embodiments stores a program for causing a computer to execute processing including acquiring tracking information regarding a tracking indicating a movement of a person in a monitoring region, determining at least one or more feature points on the tracking in the monitoring region based on the tracking information, determining a section of the tracking according to the determined feature points, and analyzing the tracking information for each determined section.

A tracking system according to one aspect of the some non-limiting embodiments includes acquisition unit for acquiring tracking information regarding a tracking indicating a movement of a person in a monitoring region, feature point determination unit for determining at least one or more feature points on the tracking in the monitoring region based on the tracking information, section determination unit for determining a section of the tracking according to the feature points determined by the feature point determination unit, analysis unit for analyzing the tracking information for each section determined by the section determination unit, and display unit for displaying an analysis result of the tracking information by the analysis unit.

Advantageous Effects of Some Non-Limiting Embodiments

According to one aspect of the some non-limiting embodiments, it is possible to facilitate pre-setting for tracking.

EXAMPLE EMBODIMENT

First Example Embodiment

An example embodiment of the some non-limiting embodiments will be described with reference to FIGS. 1 to 4.

(Tracking System 1000)

Figure 1:
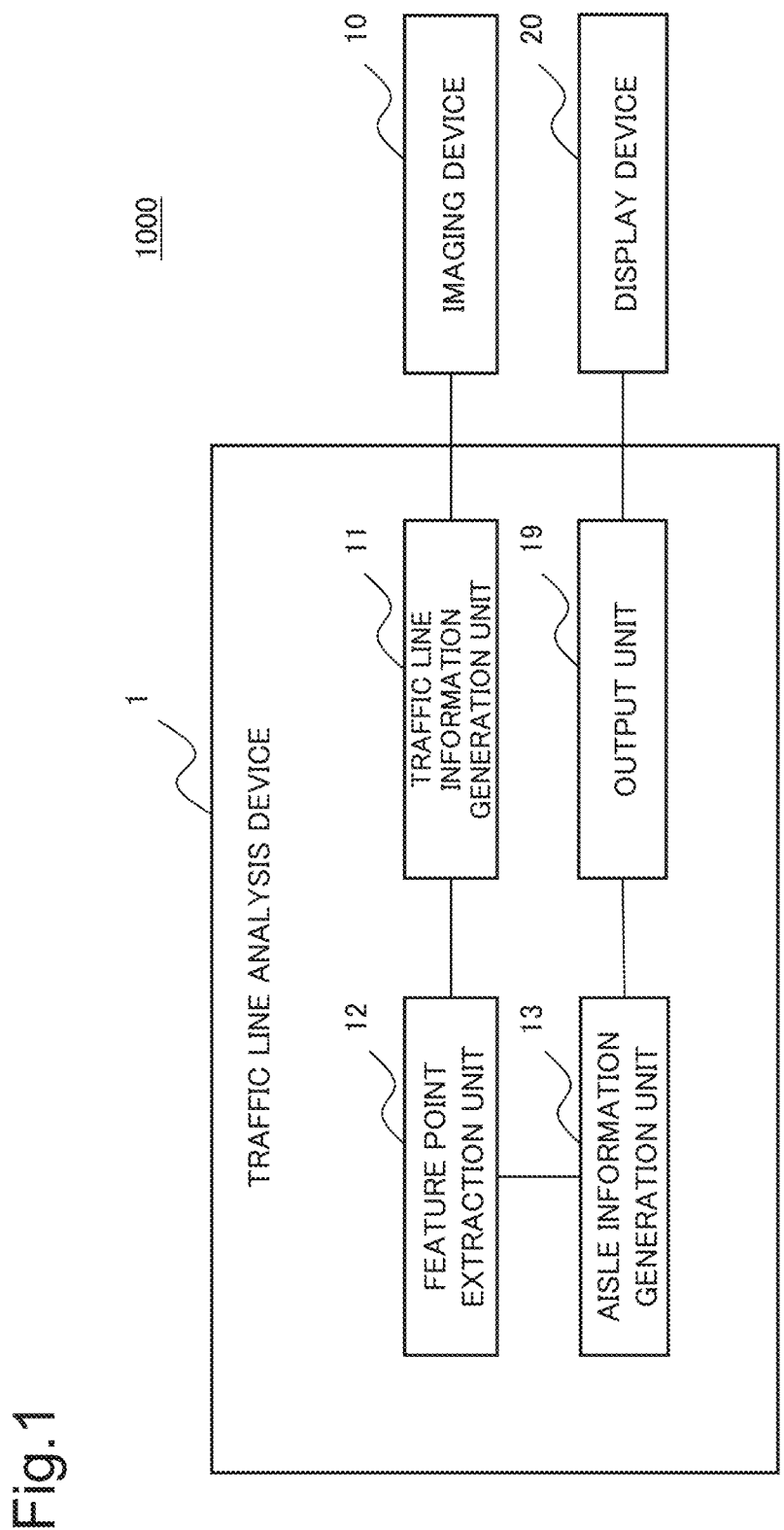
FIG. 1 is a block diagram illustrating a configuration of a tracking system according to a first example embodiment.

FIG. 1 is a block diagram illustrating a configuration of a tracking system 1000. As illustrated in FIG. 1, the tracking system 1000 includes a tracking device 1, an imaging device 10, and a display device 20.

The imaging device 10 captures an image in a store which is a monitoring region by the tracking device 1. Specifically, the imaging device 10 is one or more cameras having a function of capturing one or more images such as a moving image and a video. The monitoring region by the camera is a space in a store where shelves on which goods or products are placed are arranged. The shelf on which the goods are placed is referred to as a gondola. In the present example embodiment, the monitoring region by the tracking device 1 will be described as a store. However, the monitoring region is not limited to this. For example, the monitoring region may be an event site.

The display device 20 is a device that displays a tracking result by the tracking device 1. The display device 20 may be a display apparatus independent from the tracking device 1, for example, a monitor, a tablet terminal, or the like. Alternatively, the display device 20 may be integrated with the tracking device 1. In a case where the display device 20 is the display apparatus independent from the tracking device 1, the tracking device 1 wirelessly or wiredly transmits the tracking result to the display device 20 and makes the display device 20 display the tracking result.

(Tracking Device 1)

A configuration of the tracking device 1 according to the present example embodiment will be described with reference to FIG. 1. The tracking device 1 acquires video data of a moving image in the monitoring region (hereinafter, referred to as moving image information) from the imaging device 10. The moving image information includes a plurality of frame images. The tracking device 1 analyzes moving image information of a moving image including a person and outputs the analysis result to the display device 20 or the like.

As illustrated in FIG. 1, the tracking device 1 includes a tracking information generation unit 11, a feature point extraction unit 12, an aisle information generation unit 13, and an output unit 19.

Processing executed by each of the tracking information generation unit 11 to the output unit 19 will be described together with description of tracking processing (FIG. 3) below.

(Example of Tracking Information)

Figure 2:
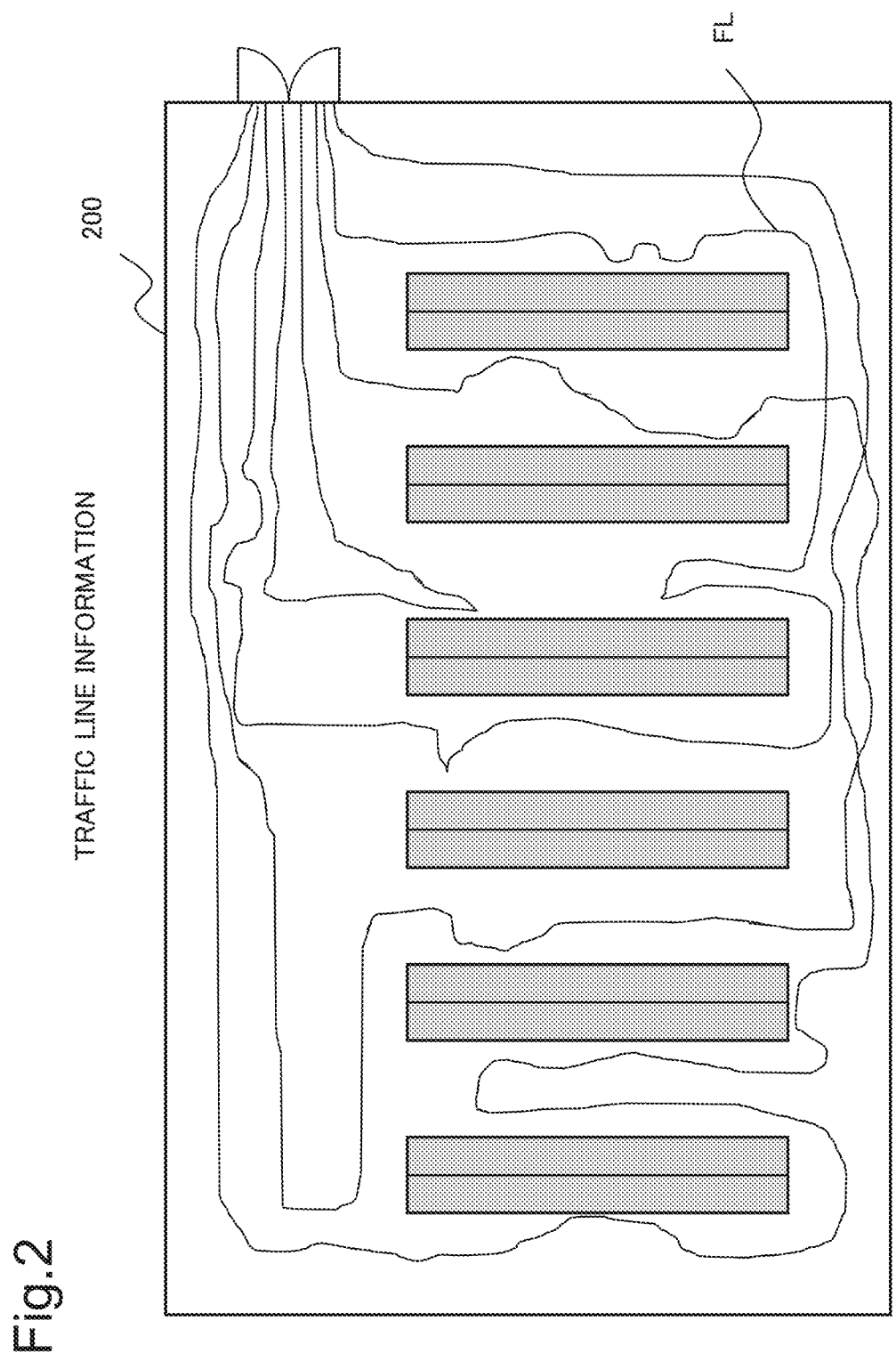
FIG. 2 is a diagram illustrating an example of tracking information indicating a history of a tracking of a person in a store.

FIG. 2 is a diagram for explaining an example of tracking information used by the tracking device 1. In FIG. 2, a plurality of trackings FL each indicating a trace of a movement of each of a plurality of persons imaged by the imaging device 10 is displayed on a screen of the display device 20. On the screen of the display device 20 illustrated in FIG. 2, layout information 200 of the store is displayed, in addition to the trackings FL. The tracking device 1 identifies a person from a frame image, detects a position of the person from the plurality of frames, and generates tracking information that is data indicating the tracking of the person.

The tracking information is stored in a storage device (not illustrated) in association with information used to identify the person, for example, a person IDentifier (ID). The tracking information includes position information indicating a position of a person. The position information is a set of points indicating positions in time series. The tracking information may further include direction information indicating a direction of a movement of a person, in addition to the position information. The direction information is obtained, for example, from a time-series change in the position of the person. Moreover, the tracking information may include time information indicating a time period in which the person remains at the same position. In short, the tracking information includes a result of tracking the trackings of the plurality of persons in the store. A method of generating the tracking is not limited to the method described above. For example, the tracking device 1 may track the tracking of the person by detecting radio waves or infrared rays emitted from a beacon or the like provided in a cart or a shopping basket carried by the person by using a sensor.

(First Tracking Processing)

Figure 3:
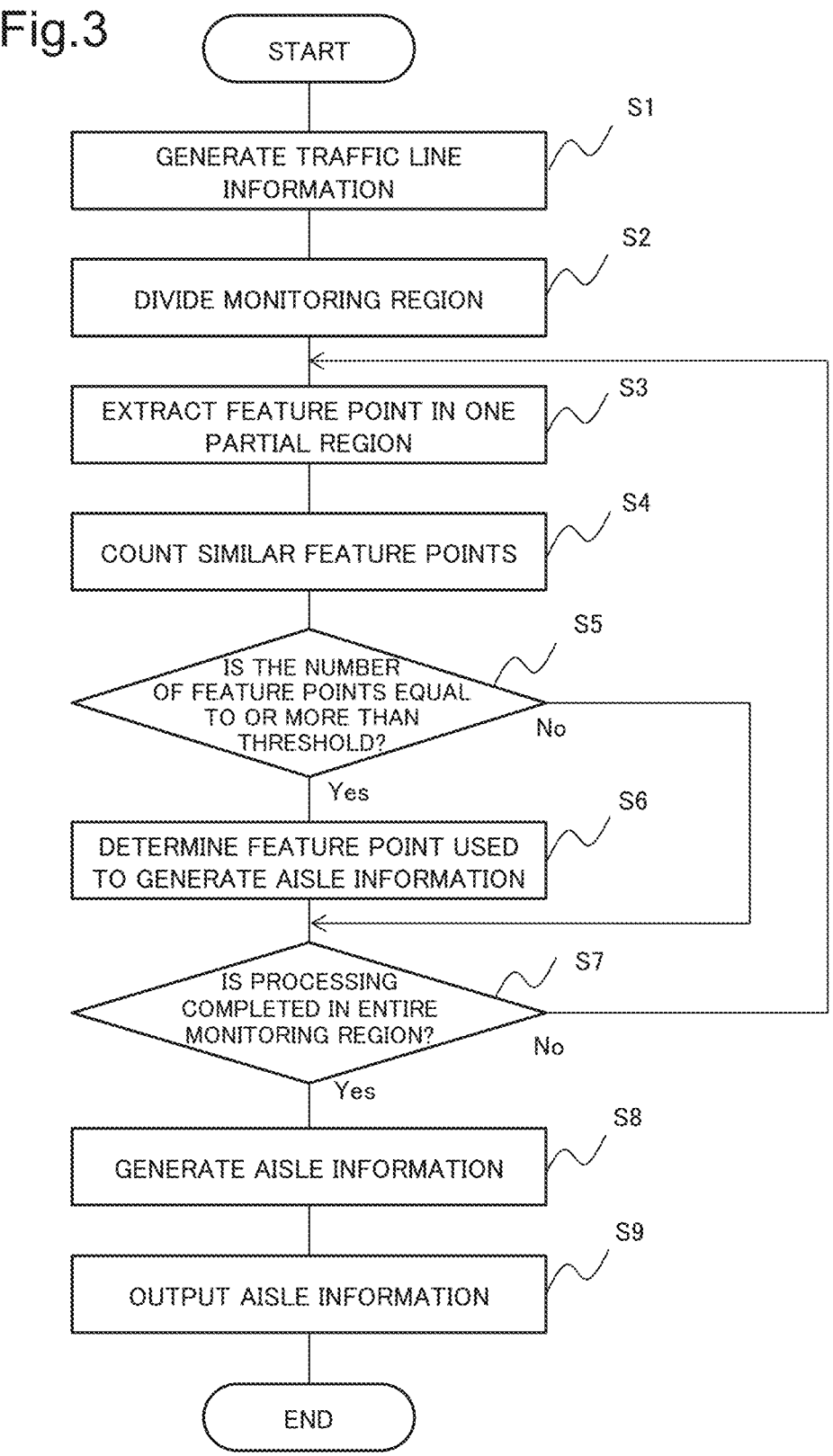
FIG. 3 is a flowchart illustrating a flow of first tracking processing executed by a tracking device according to the first example embodiment.

A flow of first tracking processing executed by the tracking device 1 according to the present example embodiment will be described with reference to FIG. 3. FIG. 3 is a flowchart illustrating the flow of the first tracking processing.

As illustrated in FIG. 3, the tracking information generation unit 11 acquires video data imaged by the imaging device 10 (FIG. 1). Then, the tracking information generation unit 11 generates the tracking information (FIG. 2) by analyzing the acquired video data (S1). The tracking information generation unit 11 is an example of acquisition unit for acquiring the tracking information regarding the tracking indicating the movement of the person in the monitoring region.

In a case where one piece of the tracking information is generated by the tracking information generation unit 11 in step S1, next step S2 and step S7 to be described later are unnecessary.

The feature point extraction unit 12 divides the monitoring region into a plurality of partial regions (S2). Next, the feature point extraction unit 12 extracts a feature point in a single partial region from the tracking information generated by the tracking information generation unit 11 (S3). In order to determine which feature point is to be extracted from the tracking information by the feature point extraction unit 12, a user may set an extraction condition in advance to extract the feature point. This makes it possible for the feature point extraction unit 12 to extract only a feature point that matches the extraction condition that has been set in advance. In the present example embodiment, the feature point is a position where the person turns. The position where the person turns includes a position where the person has turned and a position where the person has turned back an aisle. The feature point extraction unit 12 may collectively use the plurality of feature points in a region having a predetermined size as a single feature point, in the tracking information of the same person.

The feature point extraction unit 12 is an example of feature point determination unit for determining at least one or more feature points on the tracking in the monitoring region on the basis of the tracking information.

In one modification, the feature point extraction unit 12 may calculate a density of the feature points instead of dividing the monitoring region as in step S2 described above or may count the number of feature points around a single feature point.

Subsequently, the feature point extraction unit 12 counts similar feature points in the partial region (S4). Here, the similar feature points indicate points having a common behavior or operation of the person indicated by the tracking information. In the present example embodiment, the similar feature points include points where the person turns in the same direction. Although both of a feature point where a person turns in a first direction and a feature point where a person turns in a second direction are points where the person turns, it is preferable that the feature point extraction unit 12 distinguish these feature points.

In a case where the number of similar feature points is equal to or more than a threshold in the partial region (Yes in S5), the feature point extraction unit 12 determines the similar feature points as feature points used to generate aisle information (S6). The threshold may be a predetermined value, or after the number of feature points existing in each partial region in the monitoring region is counted, an average value of the number of feature points may be used as the threshold.

In a case where processing from step S3 to step S6 is not completed in the entire monitoring region (No in S7), that is, in a case where there is a partial region where the feature point is not extracted, the flow returns to step S3.

On the other hand, in a case where the processing from step S3 to step S6 is completed in the entire monitoring region (Yes in S7), the aisle information generation unit 13 generates the aisle information by acquiring information regarding the feature points determined by the feature point extraction unit 12 and executing processing to be described later on the information regarding the determined feature points (S8). The aisle information is information indicating an aisle in the store. The aisle information generation unit 13 is an example of aisle output unit for outputting the aisle information in the monitoring region on the basis of a section of the tracking. The aisle information generation unit 13 is also an example of section determination unit for determining the section of the tracking according to the determined feature points. In the present example embodiment, the section of the tracking unit a region between the adjacent feature points in the aisle information generated by the aisle information generation unit 13. The region here includes the aisles in the store.

As described above, one of the main features of the tracking device 1 according to the present example embodiment is to determine the feature points on the basis of the tracking information and automatically generate the aisle information. An example of the aisle information will be described later.

The output unit 19 outputs the aisle information (FIG. 4) generated by the aisle information generation unit 13 (S9). Thereafter, the first tracking processing ends.

(Generation of Aisle Information; Step S8)

Figure 4:
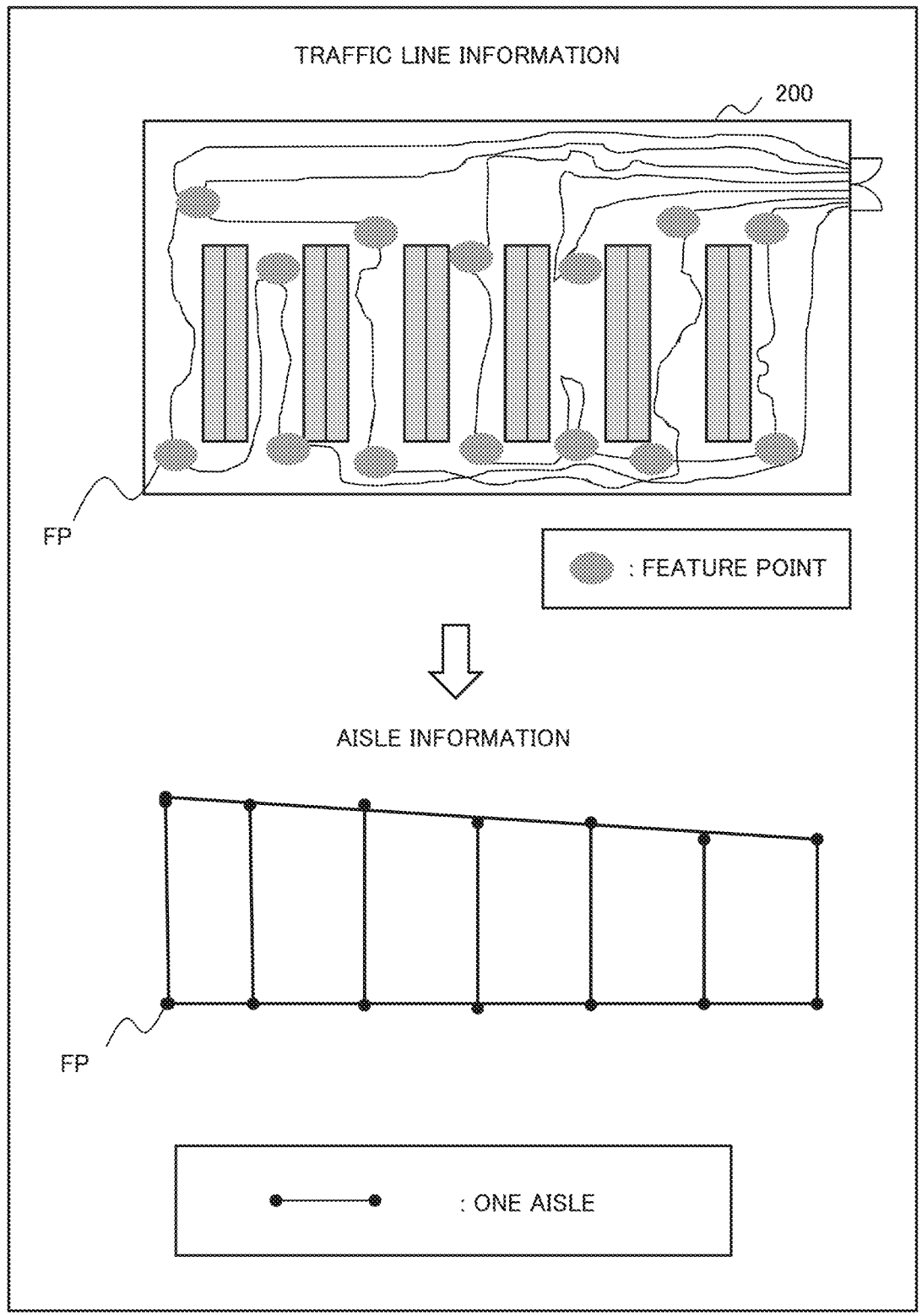
FIG. 4 is a diagram illustrating an example of aisle information generated on the basis of the tracking information.

Processing of generating the aisle information executed by the aisle information generation unit 13 will be described with reference to FIG. 4. This processing corresponds to step S8 in the first tracking processing illustrated in FIG. 3. The layout information 200 illustrated in FIG. 4 is the same as that illustrated in FIG. 2. However, in FIG. 4, the feature points FP are illustrated on the layout information 200. The aisle information illustrated in FIG. 4 is generated by the aisle information generation unit 13, according to a procedure to be describe below, from the tracking information generated by the tracking information generation unit 11. However, the procedure to be described below is only an example of the method of generating the aisle information.

As illustrated in FIG. 4, after generating a set of temporary aisles by connecting the adjacent feature points, the aisle information generation unit 13 deletes a temporary aisle through which no tracking passes. This is because there is a high possibility that the temporary aisle through which no tracking passes is not related to the aisles in the store. The aisle information generation unit 13 sets the set of the remaining temporary aisles as the aisle information indicating the aisles in the store. Therefore, an interval between the two adjacent feature points FP is related to one aisle in the aisle information.

Alternatively, the aisle information generation unit 13 may determine the direction of the movement of the person by using the direction information or the time-series position information of the person included in the tracking information and may determine the aisle in the store on the basis of the direction of the movement of the person. In a case where the temporary aisle is related to the aisle in the store, the tracking traveling in the same direction as the temporary aisle exists. However, in a case where the temporary aisle is not related to the aisle in the store, the tracking traveling in the same direction as the temporary aisle does not exist. Therefore, the aisle information generation unit 13 can determine the aisle in the store and the temporary aisle that is not related to the aisle in the store by using the direction information together with the information regarding the feature points and generate the aisle information.

In this way, in the present example embodiment, the aisle information generation unit 13 automatically generates the aisle information from the tracking information. Therefore, it is not necessary for a user to determine the feature points FP and to create the aisle information.

(Modification)

According to the modification, the tracking device 1 further includes an input device that receives an input operation to add or correct the feature points (and counting standard). The input device outputs information regarding the feature points based on the input operation to the display device 20. In this case, the display device 20 displays both of the information regarding the feature points input by the input device and the information regarding the feature points extracted by the feature point extraction unit 12 in a distinguishable manner. For example, the display device 20 displays the information regarding the feature points input by the input device and the information regarding the feature points extracted by the feature point extraction unit 12 in different colors. The input device is an example of second input unit.

In another modification, the feature point extraction unit 12 changes the feature points determined in step S6 on the basis of the information regarding the feature points generated by the input device. In this case, the display device 20 changes the information regarding the feature points extracted by the feature point extraction unit 12 to the information regarding the feature points input by the input device and displays the changed information in a different form (for example, different color) from the feature points before being changed.

(Effects of Present Example Embodiment)

In the related art, a user determines a point to be focused and a monitoring area referring to an allocation of goods on the shelves and a layout of the store and manually performs pre-setting for tracking. However, this method not only takes a lot of trouble for pre-setting but also needs experiences, intuition, know-how, and trial-and-error of the user.

On the other hand, according to the configuration of the present example embodiment, the feature points are determined on the basis of the tracking information, and the aisle information is generated by using the determined feature points. This makes it possible for the user to facilitate the pre-setting for the tracking. It is possible to easily generate the aisle information in the monitoring region. Moreover, even in a case where a layout of the monitoring region is changed, the aisle information can be regenerated from the tracking information. Therefore, it is possible to easily cope with the layout change.

Second Example Embodiment

In the above example embodiment, the configuration has been described in which the feature point is the position where the tracking of the person turns. However, the feature point is not limited to this.

In the present example embodiment, the feature point includes a position where a speed of the tracking of the person suddenly increases or decreases, for example, a position where an acceleration is equal to or more than a certain value. In tracking information of the same person, a plurality of feature points in a region having a predetermined size may be collectively used as a single feature point.

Next, the other example embodiments of the some non-limiting embodiments will be described with reference to FIGS. 5 to 10. In the present example embodiment, a tracking device generates a counting standard from the tracking information. The counting standard defines a counting section in which the number of trackings is counted. A region between adjacent feature points is a single counting section. The region here includes, for example, aisles in a store. Alternatively, a predetermined range around a feature point may be used as the counting section.

In the present example embodiment, in addition to the position where the tracking of the person turns, a position where the tracking of the person pauses, a position where a speed of the person changes and before and after the position, and a position where the speed of the person suddenly increases or decreases, that is, an acceleration is equal to or more than a certain value are included in the feature points.

(Tracking System 2000)

Figure 5:
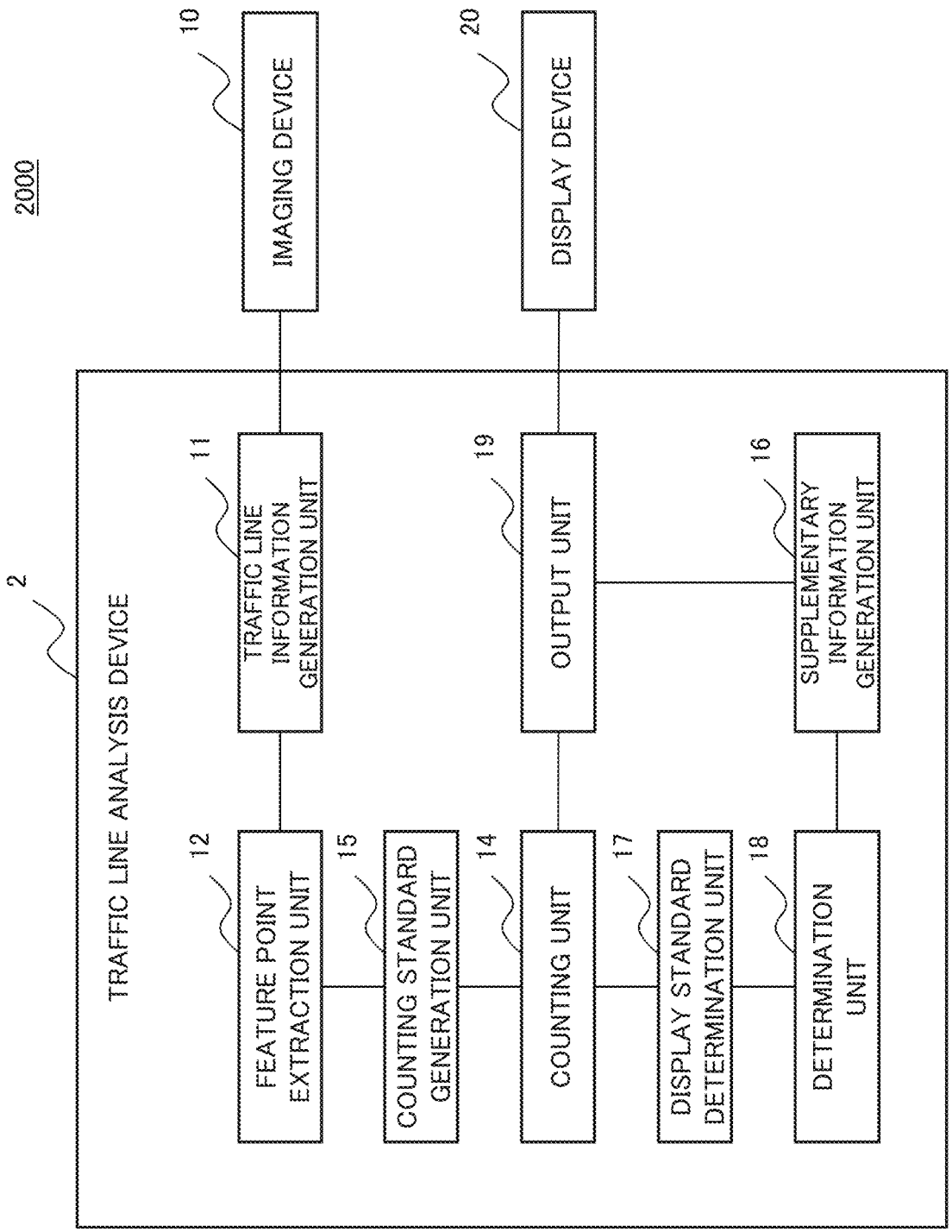
FIG. 5 is a block diagram illustrating a configuration of a tracking system according to a second example embodiment.

FIG. 5 is a block diagram illustrating a configuration of a tracking system 2000. As illustrated in FIG. 5, the tracking system 2000 includes a tracking device 2, an imaging device 10, and a display device 20. In the present example embodiment, description of the imaging device 10 and the display device 20 will be omitted.

(Tracking Device 2)

A configuration of the tracking device 2 according to the present example embodiment will be described with reference to FIG. 5. The tracking device 2 acquires moving image information of a moving image in a monitoring region from the imaging device 10. The moving image information includes a plurality of frame images. The tracking device 2 analyzes moving image information of a moving image including a person and outputs the analysis result to the display device 20.

As illustrated in FIG. 5, the tracking device 2 includes a tracking information generation unit 11, a feature point extraction unit 12, a counting unit 14, a counting standard generation unit 15, a supplementary information generation unit 16, a display standard determination unit 17, a determination unit 18, and an output unit 19.

Processing executed by each of the tracking information generation unit 11 to the output unit 19 will be described together with description of tracking processing below.

(Second Tracking Processing)

Figure 6:
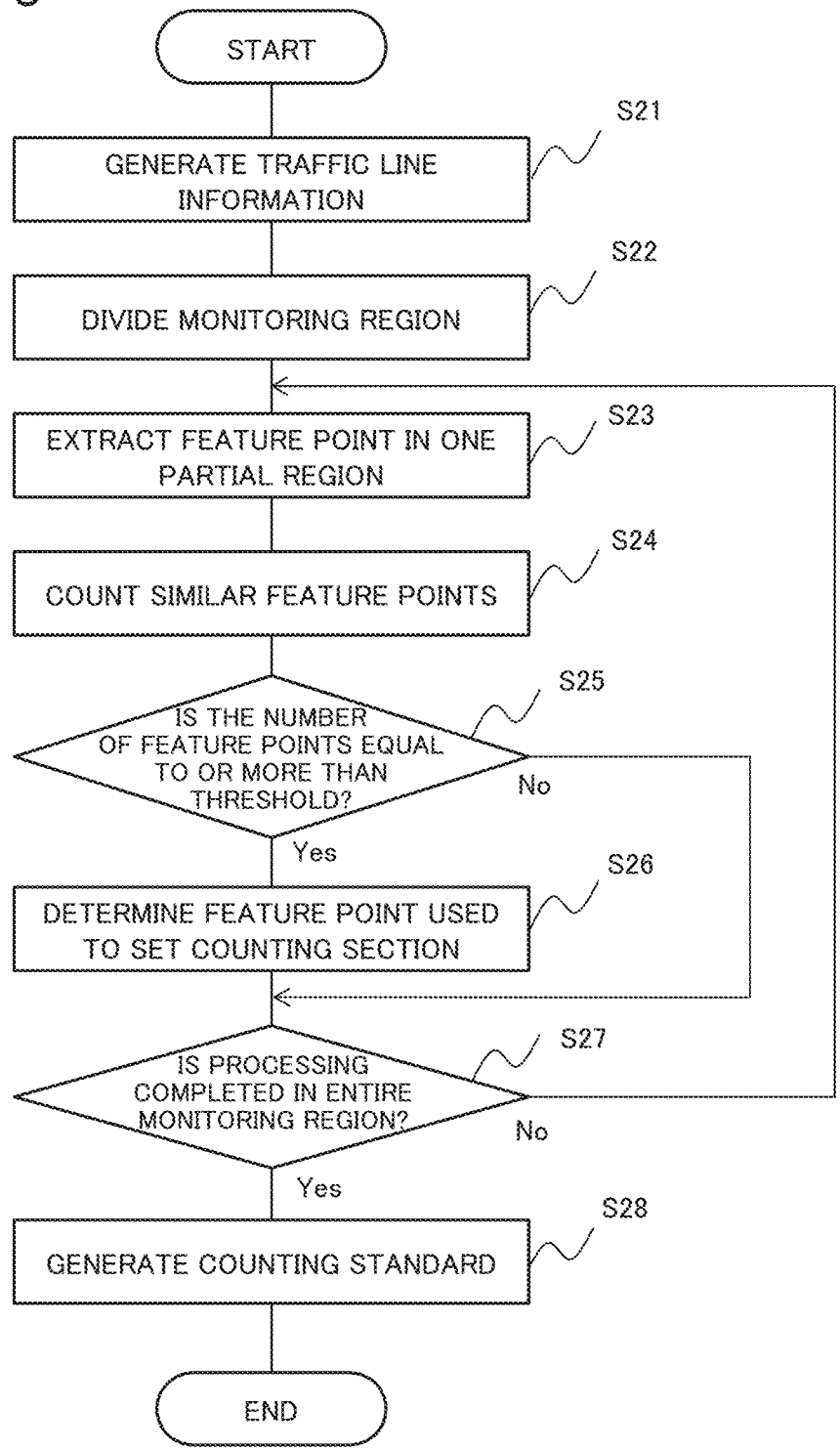
FIG. 6 is a flowchart illustrating a flow of second tracking processing executed by a tracking device according to the second example embodiment.

A flow of second tracking processing executed by the tracking device 2 according to the present example embodiment will be described with reference to FIG. 6. FIG. 6 is a flowchart illustrating the flow of the second tracking processing.

As illustrated in FIG. 6, the tracking information generation unit 11 generates tracking information by using moving image information of a moving image acquired from the imaging device 10 (S21).

In a case where one piece of the tracking information is generated by the tracking information generation unit 11 in step S21, next step S22 and step S27 to be described later are unnecessary.

The feature point extraction unit 12 divides the monitoring region into a plurality of partial regions (S22). Next, the feature point extraction unit 12 extracts a feature point in a partial region from the tracking information generated by the tracking information generation unit 11 (S23). In the present example embodiment, a feature point includes a change point that is a position where at least one of a speed and a direction of a person changes. The feature point may be determined at a position before or after the change point.

The feature point extraction unit 12 is an example of feature point determination unit for determining at least one or more feature points on the tracking in the monitoring region from the tracking information.

Subsequently, the feature point extraction unit 12 counts similar feature points in the partial region (S24).

In a case where the number of similar feature points is equal to or more than a threshold in the partial region (Yes in S25), the feature point extraction unit 12 determines the similar feature points as feature points to be used to determine a counting section (S26).

In a case where processing from step S23 to step S26 is not completed in the entire monitoring region (No in S27), the flow returns to step S23.

On the other hand, in a case where the processing from step S23 to step S26 is completed in the entire monitoring region (Yes in S27), the counting standard generation unit 15 acquires information regarding the feature points determined by the feature point extraction unit 12 and determines a region between the two adjacent feature points as the counting section. Then, the counting standard generation unit 15 generates one counting standard including the plurality of counting sections (S28).

In a case where a certain counting section is wider than a predetermined size, the counting standard generation unit 15 may divide the counting section into a plurality of counting sections smaller than the predetermined size. A method of dividing the counting section is not particularly limited.

Alternatively, in a case where the certain counting section is wider than the predetermined size, the flow returns to step S25, and the feature point extraction unit 12 may count the similar feature points in the partial region again by using a smaller threshold. Because this increases the number of feature points used to determine the counting section, the counting section that is the region between the two adjacent feature points can be narrowed as a result.

The counting standard generation unit 15 is an example of section determination unit for determining a section of a tracking according to the feature points determined by the feature point determination unit. In the present example embodiment, the section of the tracking unit a counting section included in the counting standard generated by the counting standard generation unit 15.

One of main features of the tracking device 2 according to the present example embodiment is to extract the feature points from the tracking information and automatically generate the counting standard. An example of the counting standard will be described later.

(Generation of Counting Standard; step S28)

Figure 7:
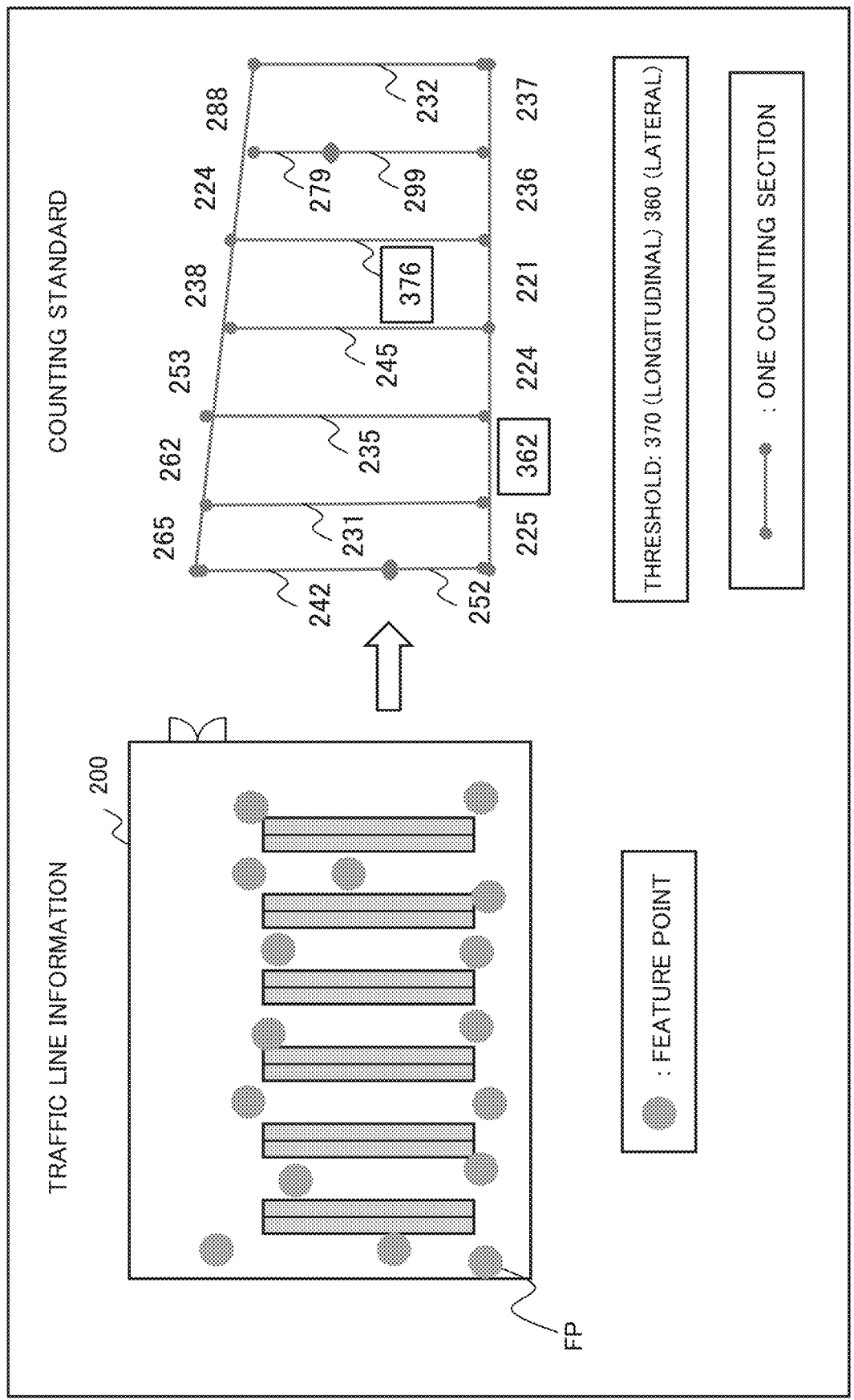
FIG. 7 is a diagram illustrating an example of a counting standard indicating a result of counting the number of trackings on the counting standard.

Processing of generating the counting standard executed by the counting standard generation unit 15 will be described with reference to FIG. 7. This processing corresponds to step S28 in the second tracking processing illustrated in FIG. 6. Layout information 200 illustrated in FIG. 7 is the same as that illustrated in FIG. 2. However, in FIG. 7, the feature points FP are illustrated on the layout information 200. The counting standard illustrated in FIG. 7 is generated by the counting standard generation unit 15 according to a procedure to be described below from the tracking information generated by the tracking information generation unit 11. However, the procedure to be described below is only an example of the method of generating the counting standard.

As illustrated in FIG. 7, the counting standard generation unit 15 generates a set of temporary counting sections by connecting the adjacent feature points FP determined by the feature point extraction unit 12. Thereafter, the counting standard generation unit 15 deletes a temporary counting section through which no tracking passes. This is because there is a high possibility that the temporary counting section through which no tracking passes is not related to the aisles in the store. The counting standard generation unit 15 sets a set of the remaining temporary counting sections as the counting standard.

As described above, in the present example embodiment, the counting standard generation unit 15 automatically generates the counting standard from the tracking information. Therefore, it is not necessary for a user to determine the feature point FP and to determine the counting standard.

(Third Tracking Processing)

Figure 8:
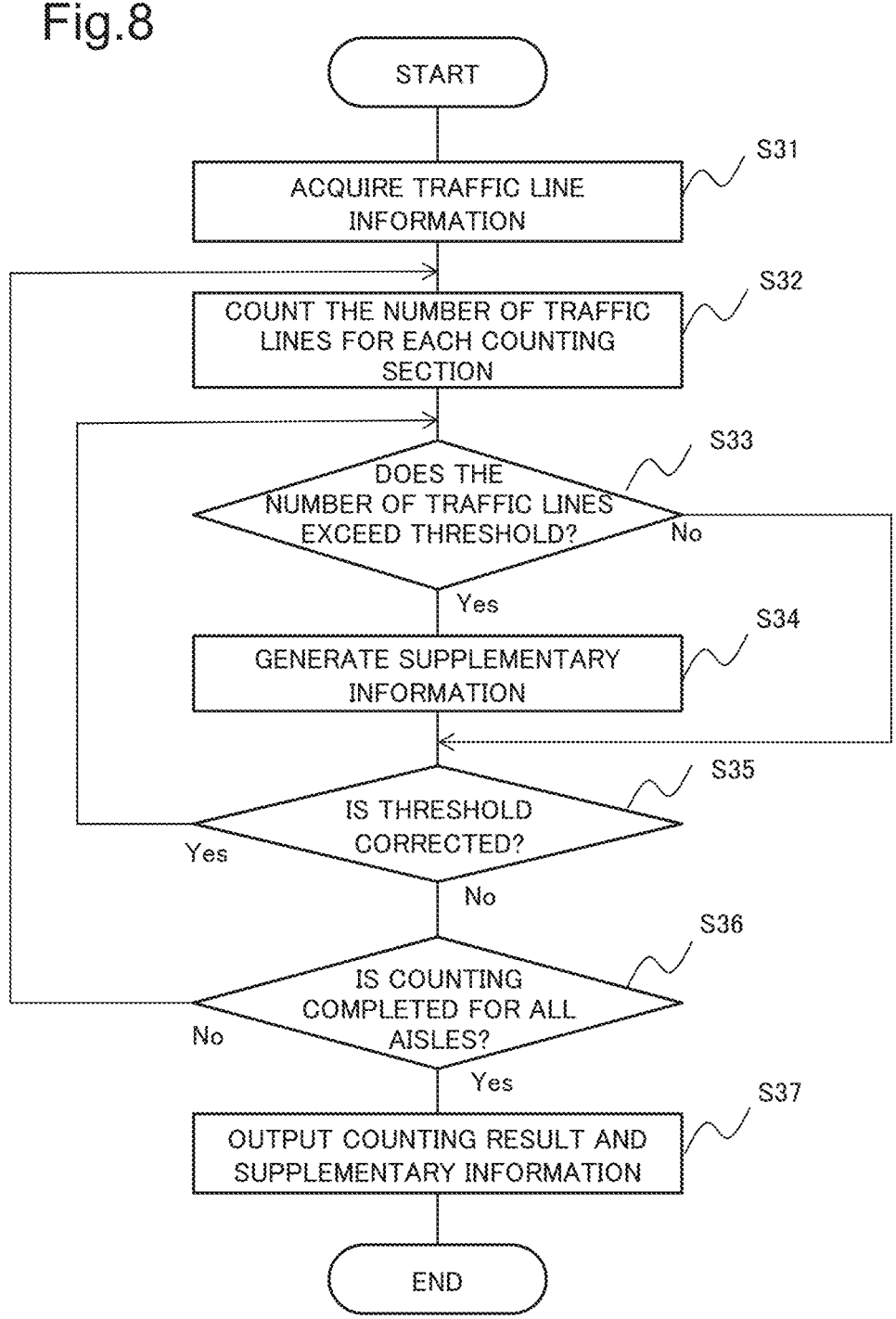
FIG. 8 is a flowchart illustrating a flow of third tracking processing executed by the tracking device according to the second example embodiment.

A flow of third tracking processing executed by the tracking device 2 according to the present example embodiment will be described with reference to FIG. 8. FIG. 8 is a flowchart illustrating the flow of the third tracking processing.

As illustrated in FIG. 8, the counting unit 14 acquires the tracking information (S31). In step S31, the tracking information acquired by the counting unit 14 may be the tracking information generated by the tracking information generation unit 11 or not. In a case where the tracking information is not generated by the tracking information generation unit 11, the counting unit 14 may acquire the tracking information, for example, from a recording medium that stores the collected tracking information or a network server.

The counting unit 14 counts the number of trackings for each counting section included in the counting standard generated by the counting standard generation unit 15 in the second tracking processing (S32). Here, the number of trackings represents the number of persons who have passed through the counting section or the number of persons who at least have entered the counting section. The counting unit 14 is an example of analysis unit.

The display standard determination unit 17 determines a display standard regarding an output of the counting result on the basis of the counting result counted by the counting unit 14. The display standard is a threshold used to extract the number of unique trackings from the counting result. In one example, the display standard may be a value that exceeds an average value of the number of trackings in the counting result by a value equal to or more than a certain value.

The determination unit 18 determines whether the number of trackings exceeds a threshold determined based on the display standard for each counting section in the counting standard (S33).

In a case where the number of trackings counted in one counting section does not exceed the threshold (No in S33), the tracking processing proceeds to step S35.

On the other hand, in a case where the number of trackings counted in one counting section exceeds the threshold (Yes in S33), the supplementary information generation unit 16 generates supplementary information regarding the counting section (S34). Thereafter, the supplementary information generation unit 16 makes the display device 20 display the generated supplementary information via the output unit 19. In a case where the number of s that pass through the single counting section exceeds the threshold, the supplementary information generation unit 16 makes the display device 20 display supplementary information to be described later. An example of the supplementary information will be described later.

Moreover, the display standard determination unit 17 may determine the display standard with respect to the counting section. Specifically, the display standard indicates a frequency at which the supplementary information generation unit 16 makes the display device 20 display the supplementary information. In a case where the number of trackings that pass through the single counting section exceeds the threshold, the supplementary information generation unit 16 may determine whether to make the display device 20 display the supplementary information to be described later on the basis of the predetermined display standard.

A user can perform an input operation to correct the display standard described above according to requests and needs by using an input device (not illustrated). The input device is a device used for an input to the tracking device 2 by the user and, for example, may be a keyboard, a mouse, a touch panel, or the like.

After step S34, in a case where the user performs the input operation to change the threshold (Yes in S35), the third tracking processing returns to step S33 described above. Then, the supplementary information generation unit 16 determines again whether the number of trackings that pass through the counting section exceeds the threshold (S33).

On the other hand, in a case where the user does not perform the input operation to change the threshold (No in S35), the third tracking processing proceeds to step S36.

In a case where the counting processing (S32) is not completed for all the feature points included in the counting standard (No in S36), the third tracking processing returns to step S32. In this case, regarding another counting section in the counting standard, the counting unit 14 determines whether the number of trackings that pass through the counting section exceeds the threshold (S33). In a case where the counting processing has completed for all the counting sections included in the counting standard (Yes in S36), the third tracking processing proceeds to step S37.

The output unit 19 outputs the counting result by the counting unit 14, that is, information indicating the number of trackings that pass through each counting section (S37). Thereafter, the third tracking processing ends.

(Counting and Determination of the Number of Trackings; Steps S32 and S33)

The counting processing executed by the counting unit 14 will be described with reference to FIG. 7. The counting processing corresponds to step S32 in the third tracking processing described above. In the counting standard illustrated in FIG. 7, a numerical value is illustrated for each counting section. Each of the numerical values represents the number of trackings that have passed through the counting section.

Processing of determining the number of trackings executed by the determination unit 18 will be described with reference to FIG. 7. The processing of determining the number of trackings corresponds to step S33 in the third tracking processing described above.

In the example described here, a threshold of the number of trackings in a counting section in the longitudinal direction is 370, and a threshold of the number of trackings in a counting section in a lateral direction is 360. With reference to the counting standard illustrated in FIG. 7, the number of trackings in a third counting section from the right in the longitudinal direction is 376, and the number of trackings in a second counting section from the left in the lateral direction is 362.

In this case, the determination unit 18 determines that the number of trackings in the third counting section from the right in the longitudinal direction and the number of trackings in the second counting section from the left in the lateral direction respectively exceed the thresholds.

(Generation of Supplementary Information; Step S34)

Figure 9:
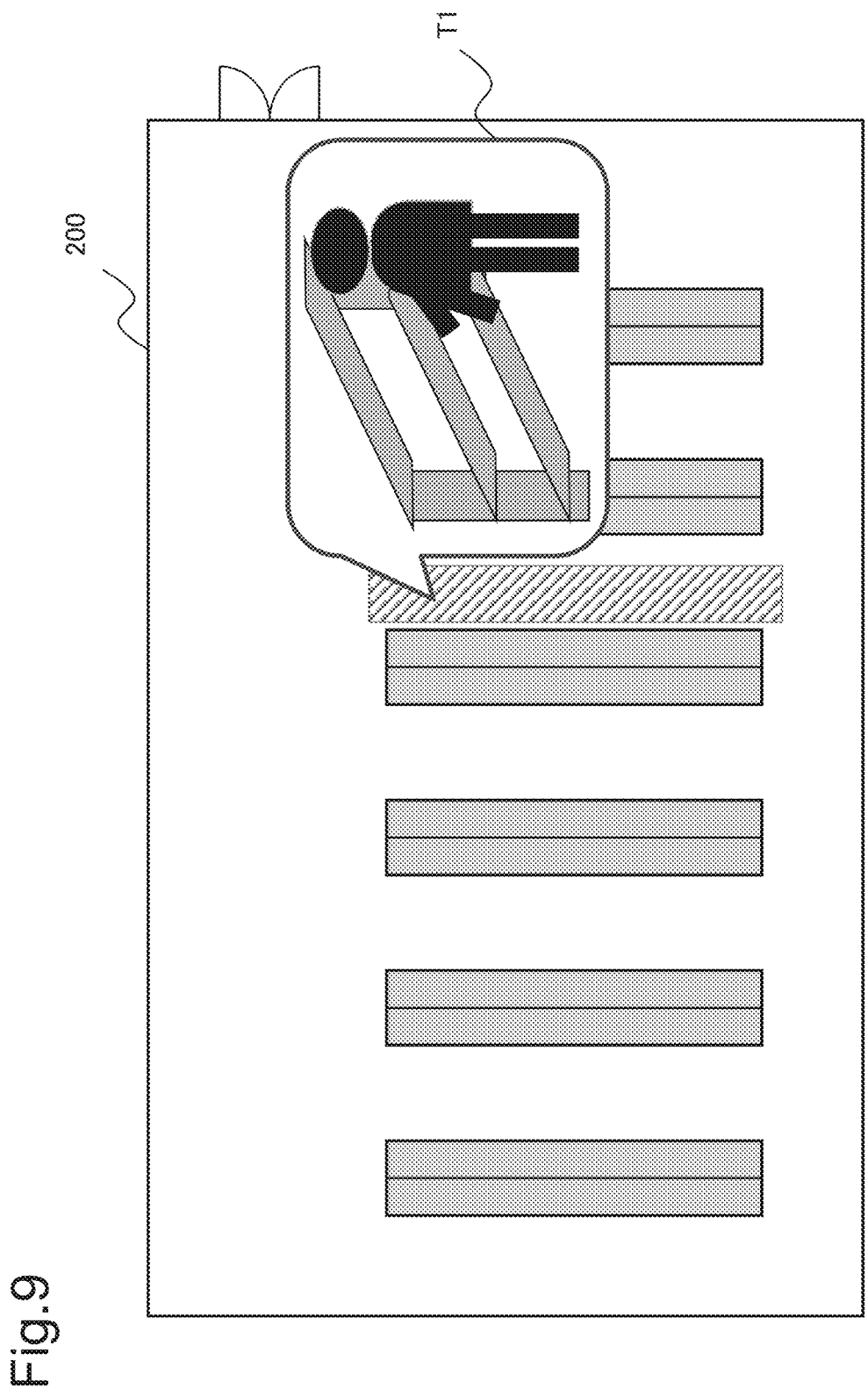
FIG. 9 is a diagram illustrating an example of supplementary information displayed by a display unit included in the tracking device according to the second example embodiment.
Figure 10:
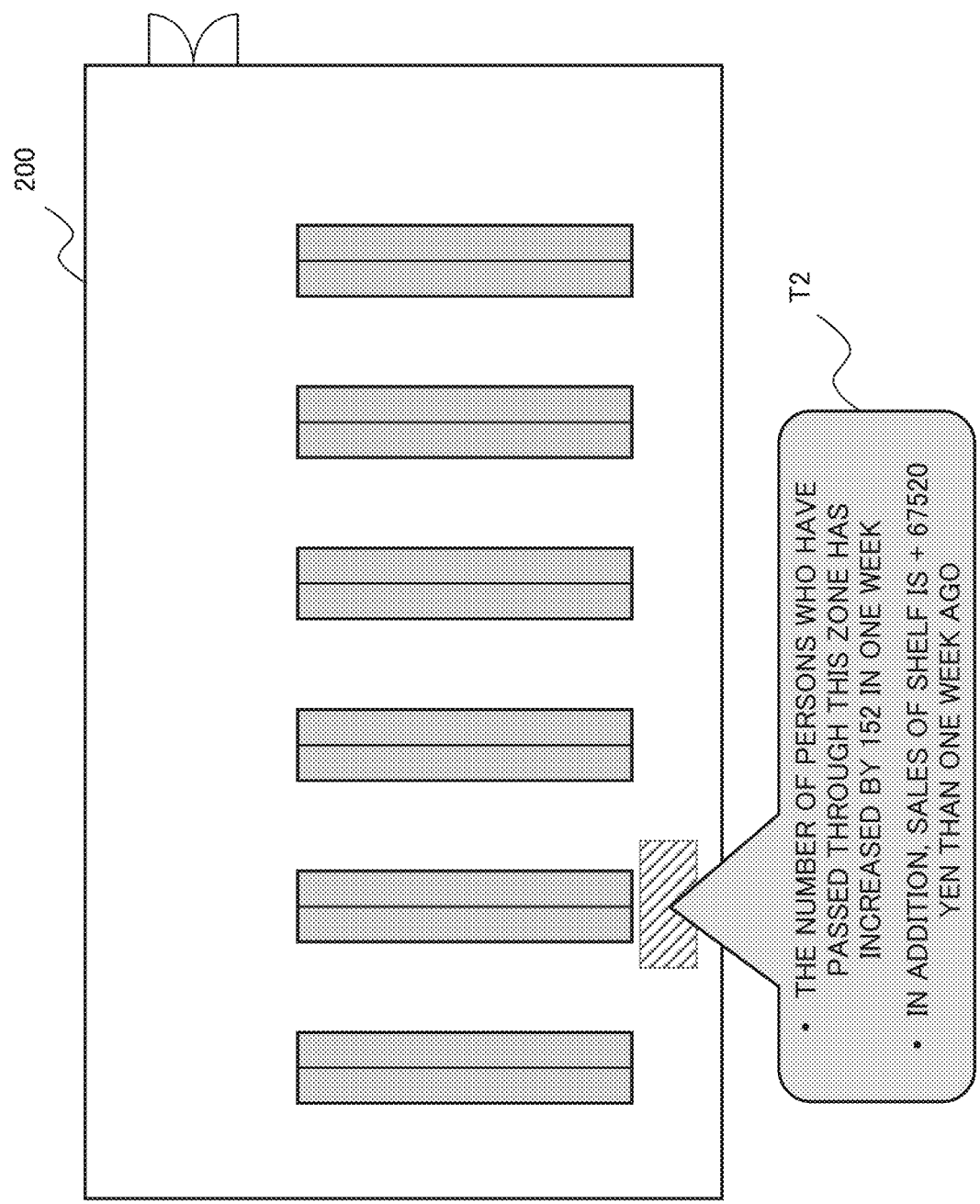
FIG. 10 is a diagram illustrating another example of the supplementary information displayed by the display unit included in the tracking device according to the second example embodiment.

FIGS. 9 and 10 illustrate examples of the supplementary information generated by the supplementary information generation unit 16 and displayed on the display device 20. Processing described here corresponds to step S34 in the third tracking processing described above. As described above, the supplementary information generation unit 16 generates supplementary information for each of one or the plurality of counting sections in which the number of trackings exceeds the threshold. The counting section in which the number of trackings exceeds the threshold is referred to as a target section here.

Supplementary information T1 illustrated in FIG. 9 includes video data superimposed on the layout information 200. The video data is obtained from moving image information of the imaging device 10 that captures an image of the vicinity of the target section. The supplementary information generation unit 16 generates the supplementary information T1 illustrated in FIG. 9 by selecting the moving image information captured by the imaging device 10.

For example, the supplementary information T1 may be moving image information, associated with information indicating the target section, obtained by capturing an image of the vicinity of the target section. The output unit 19 outputs the supplementary information T1 acquired by the supplementary information generation unit 16 to the display device 20. As illustrated in FIG. 9, the output unit 19 displays an image in a balloon together with a frame indicating the target section on the display device 20. The supplementary information T1 may be displayed by the output unit 19 for a certain period of time when the supplementary information T1 is generated, or a user, for example, a store clerk can switch a state where the tracking information illustrated in FIG. 2 is displayed and a state where the supplementary information T1 illustrated in FIG. 9 is displayed by operating an input device which is not illustrated.

Supplementary information T2 illustrated in FIG. 10 includes text data superimposed on the layout information 200. The text may include, for example, information regarding the number of persons who have passed through the target section in a predetermined period or may include information regarding sales of products on shelfs near the target section. The supplementary information generation unit 16 may generate the supplementary information T2 illustrated in FIG. 10 by accessing a management server of a store and acquiring Point Of Sales system (POS) information.

(Modification)

In one modification, the supplementary information may be moving image information captured by the imaging device 10 in a time period in which the number of trackings in the target section exceeds the threshold. In the configuration, only the moving image information captured in the time period in which the number of trackings in the target section exceeds the threshold is displayed on the display device 20. Therefore, the user can easily confirm a situation in the store in the time period in which the number of trackings in the target section exceeds the threshold.

(Effects of Present Example Embodiment)

According to the configuration of the present example embodiment, the feature points are determined on the basis of the tracking information, the counting standard is generated by using the determined feature points, and the counting standard and the supplementary information are displayed. Therefore, the user can save the trouble of determining the feature points on the basis of a layout of the store or inputting the counting standard.

Third Example Embodiment

In the present example embodiment, an example of a basic configuration of a tracking device that solves problems in the related art will be described.

(Tracking Device 3)

Figure 11:
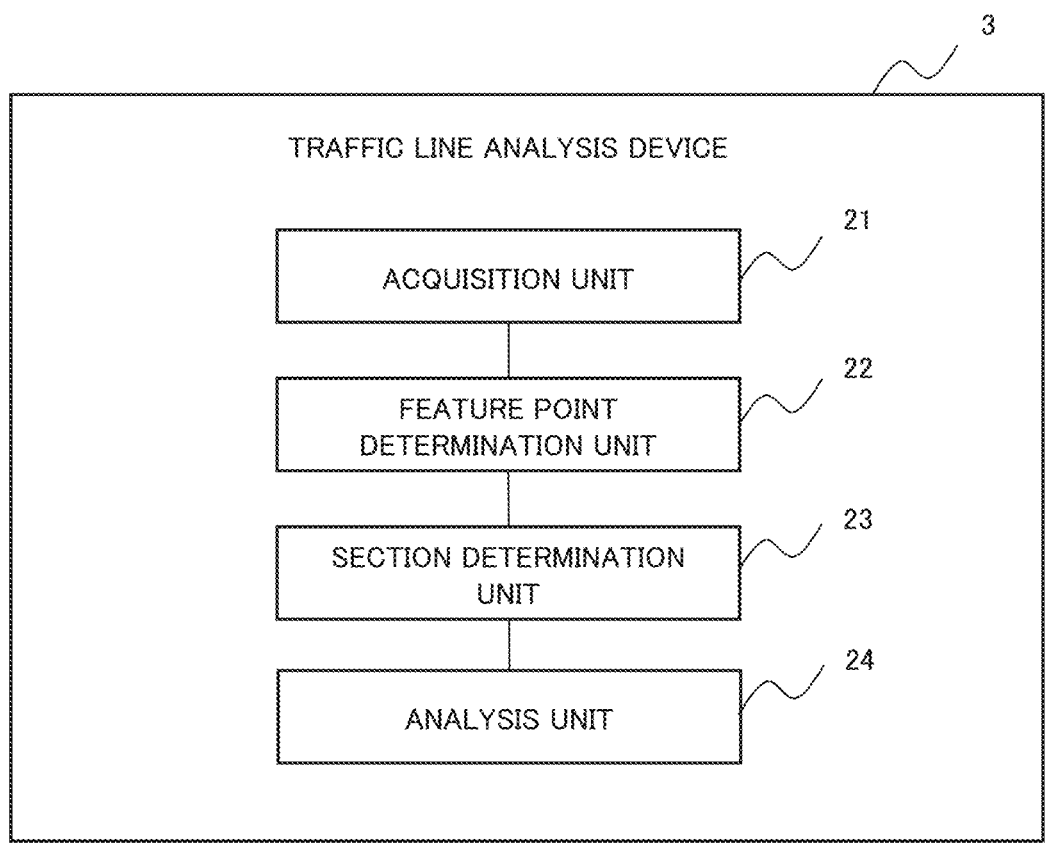
FIG. 11 is a block diagram illustrating a configuration of a tracking device according to a third example embodiment.

FIG. 11 is a block diagram illustrating a configuration of a tracking device 3 according to the present example embodiment. As illustrated in FIG. 10, the tracking device 3 includes an acquisition unit 21, a feature point determination unit 22, a section determination unit 23, and an analysis unit 24.

The acquisition unit 21 acquires tracking information regarding a tracking indicating a movement of a person in a monitoring region.

The feature point determination unit 22 determines at least one or more feature points on the tracking in the monitoring region on the basis of the tracking information acquired by the acquisition unit 21.

The section determination unit 23 determines a section of the tracking according to the feature points determined by the feature point determination unit 22.

The analysis unit 24 analyzes the tracking information for each section determined by the section determination unit 23.

(Effects of Present Example Embodiment)

According to the configuration of the present example embodiment, at least one or more feature points on the tracking are determined in the monitoring region, and the section of the tracking is determined according to the feature points. Then, the tracking information is analyzed for each determined section. Therefore, a user can save the trouble of determining the feature point by himself/herself in order to analyze the tracking information. Accordingly, the user can facilitate pre-setting for tracking.

Fourth Example Embodiment (About Hardware Configuration)

Figure 12:
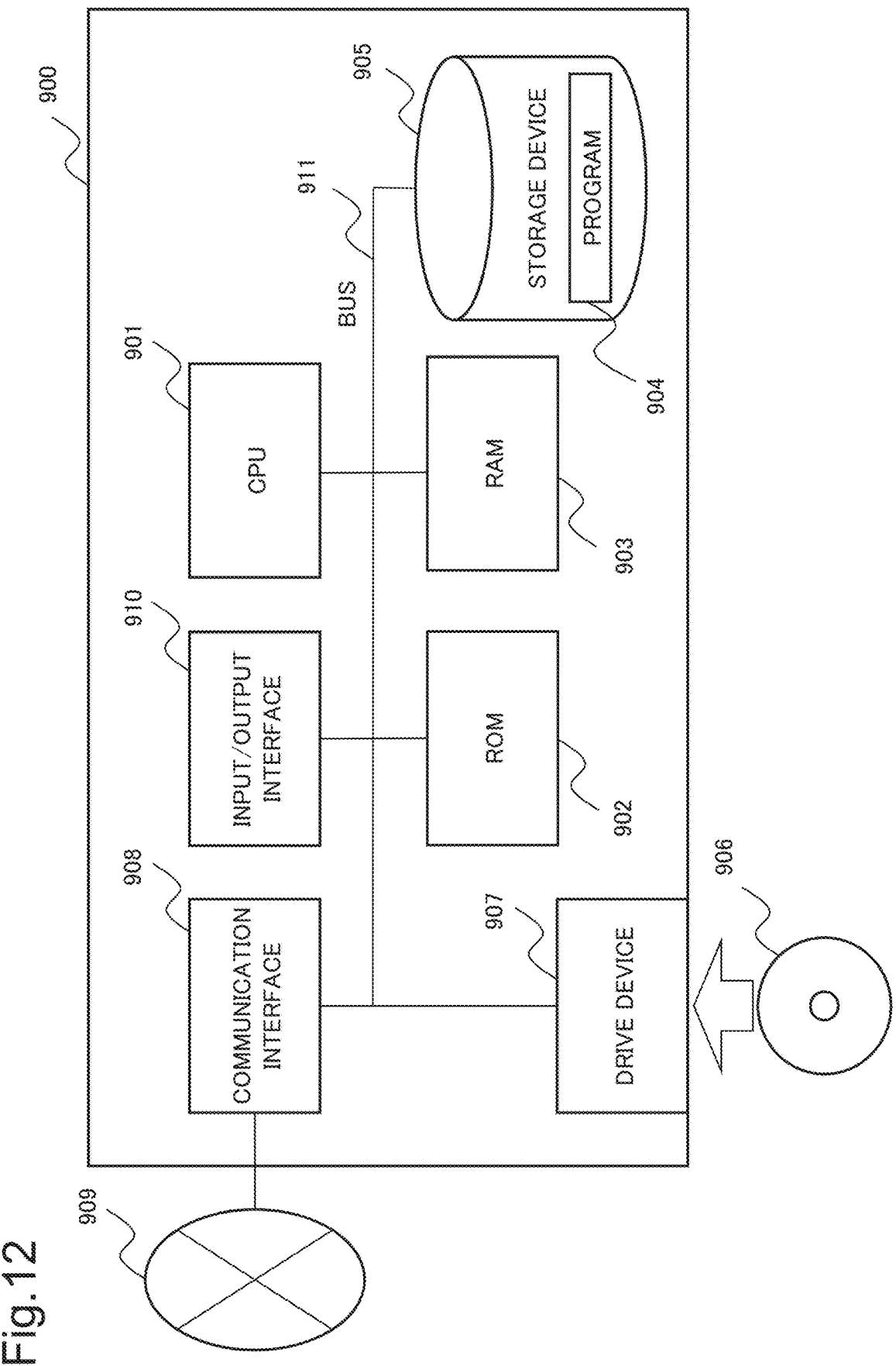
FIG. 12 is a diagram illustrating a hardware configuration of a tracking device according to a fourth example embodiment.

In each example embodiment according to the present disclosure, each component of each device indicates a block of a functional unit. Some or all of the components of each device are achieved by, for example, any combination of an information processing apparatus 900 illustrated in FIG. 12 and a program. FIG. 12 is a block diagram illustrating an example of a hardware configuration of the information processing apparatus 900 that achieves each component of each device. The information processing apparatus 900 functions similarly to the tracking devices 1 to 3 according to the first to third example embodiments. In other words, the tracking devices 1 to 3 according to the first to third example embodiments can be achieved by the components of the information processing apparatus 900 according to the present example embodiment.

As illustrated in FIG. 12, the information processing apparatus 900 includes, for example, the following configurations.

Central Processing Unit (CPU) 901 or processor
Read Only Memory (ROM) 902
Random Access Memory (RAM) 903
Program 904 loaded on RAM 903
Storage device 905 that stores program 904
Drive device 907 that reads/writes from/to recording medium 906
Communication interface 908 connected to communication network 909
Input/output interface 910 that inputs/outputs data
Bus 911 that connects components Each component in each device according to the example embodiments, for example, the tracking information generation unit 11, the feature point extraction unit 12, the aisle information generation unit 13, and the output unit 19 described in the first example embodiment is achieved by acquiring and executing the program 904 that achieves these functions by the CPU 901 or the processor. The program 904 that achieves the function of each component of each device is, for example, stored in the storage device 905 or the ROM 902 in advance, and the CPU 901 or the processor loads the program 904 on the RAM 903 and executes the program 904 as necessary. For example, a command of the program that executes the flowchart illustrated in FIG. 3 is loaded on the RAM 903 and is executed by the CPU 901.

The program 904 may be supplied to the CPU 901 via the communication network 909, or the program 904 may be stored in the recording medium 906 in advance and the drive device 907 may read the program and supply the program to the CPU 901 or the processor.

The recording medium 906 may store the tracking information and the supplementary information.

Although a part or all of the example embodiments may be described as supplementary notes below, a part or all of the example embodiments are not limited to the following supplementary notes.

(Supplementary Note 1)
A tracking device including:
acquisition unit for acquiring tracking information regarding a tracking indicating a movement of a person in a monitoring region;
feature point determination unit for determining at least one or more feature points on the tracking in the monitoring region based on the tracking information;
section determination unit for determining a section of the tracking according to the feature points determined by the feature point determination unit; and
analysis unit for analyzing the tracking information for each section of the tracking determined by the section determination unit.

(Supplementary Note 2)
The tracking device according to supplementary note 1, in which
the feature point determination unit determines a change point of the tracking as the feature point based on the tracking information.

(Supplementary Note 3)
The tracking device according to supplementary note 2, in which
the change point is at least one of a point where a direction of the tracking changes and a point where a speed of the tracking changes, based on the tracking information.

(Supplementary Note 4)
The tracking device according to any one of supplementary notes 1 to 3, in which
the section determination unit determines a region between a plurality of the feature points as the section of the tracking.

(Supplementary Note 5)
The tracking device according to any one of supplementary notes 1 to 4, further including:
aisle output unit for outputting aisle information in the monitoring region based on the section of the tracking.

(Supplementary Note 6)
The tracking device according to any one of supplementary notes 1 to 5, in which
the analysis unit counts the number of trackings passing through the section, for each section of the tracking determined by the section determination unit,
the tracking device further including:
display standard determination unit for determining a display standard regarding an output of a counting result based on the counting result counted by the analysis unit.

(Supplementary Note 7)
The tracking device according to supplementary note 6, further including:
determination unit for determining a section that satisfies the display standard; and
generation unit for generating supplementary information in the determined section.

(Supplementary Note 8)
The tracking device according to supplementary note 7, in which
the supplementary information is moving image information in the determined section.

(Supplementary Note 9)
The tracking device according to any one of supplementary notes 6 to 8, further including:
input unit for receiving an input to correct the display standard.

(Supplementary Note 10)
A tracking method including:
acquiring tracking information regarding a tracking indicating a movement of a person in a monitoring region;
determining at least one or more feature points on the tracking in the monitoring region based on the tracking information;

determining a section of the tracking according to the determined feature points; and analyzing the tracking information for each determined section of the tracking.

(Supplementary Note 11)

A tracking system including:

acquisition unit for acquiring tracking information regarding a tracking indicating a movement of a person in a monitoring region;

feature point determination unit for determining at least one or more feature points on the tracking in the monitoring region based on the tracking information;

section determination unit for determining a section of the tracking according to the feature points determined by the feature point determination unit;

analysis unit for analyzing the tracking information for each section of the tracking determined by the section determination unit; and display unit for displaying an analysis result of the tracking information by the analysis unit.

(Supplementary Note 12) The tracking system according to supplementary note 11, further including:

second input unit for receiving an input of information regarding the feature point, in which the display unit displays the information regarding the feature point input by the second input unit and information regarding the feature point determined by the feature point determination unit.

(Supplementary Note 13)

The tracking system according to supplementary note 11, further including:

second input unit for receiving an input of information regarding the feature point, in which the feature point determination unit changes the feature point on the tracking based on the information regarding the feature point input by the second input unit, and the display unit displays information regarding the feature point changed by the feature point determination unit.

(Supplementary Note 14)

A tracking method including:

acquiring tracking information regarding a tracking indicating a movement of a person in a monitoring region;

determining at least one or more feature points on the tracking in the monitoring region based on the tracking information;

determining a section of the tracking according to the determined feature points; and analyzing the tracking information for each determined section.

(Supplementary Note 15)

A program for causing a computer to execute processing including: acquiring tracking information regarding a tracking indicating a movement of a person in a monitoring region;

determining at least one or more feature points on the tracking in the monitoring region based on the tracking information;

determining a section of the tracking according to the determined feature points; and analyzing the tracking information for each determined section.

While one of the some non-limiting embodiments has been particularly shown and described with reference to exemplary embodiments thereof, one of the some non-limiting embodiments is not limited to these embodiments. It will be understood by those of ordinary skill in the art that various changes in form and details may be made therein without departing from the spirit and scope of the some non-limiting embodiments as defined by the claims.

This application is based upon and claims the benefit of priority from Japanese patent application No. 2018-106147, filed on Jun. 1, 2018, the disclosure of which is incorporated herein in its entirety by reference.

INDUSTRIAL APPLICABILITY

The some non-limiting embodiments can be used, for example, to analyze tracking information of persons in retail stores such as convenience stores or drugstores or facilities such as distribution warehouses or factories.

REFERENCE SIGNS LIST 1, 2, 3 tracking device
11 tracking information generation unit
12 feature point extraction unit
13 aisle information generation unit
14 counting unit
15 counting standard generation unit
16 supplementary information generation unit
17 display standard determination unit
18 determination unit
19 output unit
20 display device
21 acquisition unit
22 feature point determination unit
23 section determination unit
24 analysis unit
T1 supplementary information
T2 supplementary information
1000 tracking system

The invention claimed is:

1. A tracking device comprising:
at least one memory configured to store instructions; and
one or more processors configured to execute the instructions to:
acquire tracking information indicating a tracking of a person in a monitoring region;
determine one or more feature points on the tracking based on the tracking information;
determine one or more candidate sections of the tracking by connecting adjacent feature points determined;
delete at least one candidate section through which no tracking passes;
analyze the tracking information for each remaining candidate section; and
output an analysis result of the tracking information, the analysis result including store layout information.

2. The tracking device according to claim 1, wherein the one or more processors are further configured to execute the instructions to:
determine a change point of the tracking as the feature point based on the tracking information.

3. The tracking device according to claim 2, wherein the change point is at least one of a point where a direction of the tracking changes and a point where a speed of the tracking changes, based on the tracking information.

4. The tracking device according to claim 1, wherein the one or more processors are further configured to execute the instructions to:
determine the section of the tracking based on a first feature point and a second feature point.

5. The tracking device according to claim 1, wherein the one or more processors are further configured to execute the instructions to:
output aisle information in the monitoring region based on the section of the tracking.

6. The tracking device according to claim 5, wherein the one or more processors are further configured to execute the instructions to:
generate the aisle information based on the remaining the candidate sections.

7. The tracking device according to claim 1, wherein the analyzing the tracking information being, counting a number of trackings passing through the candidate section; and
wherein the one or more processors are further configured to execute the instructions to:
determine a display standard regarding whether or not to output the analysis result based on the number of trackings counted.

8. The tracking device according to claim 7, wherein the one or more processors are further configured to execute the instructions to:
determine a section that satisfies the display standard;
generate supplementary information in the determined section,
wherein, the analysis result includes the generated supplementary information.

9. The tracking device according to claim 7, wherein the one or more processors are further configured to execute the instructions to:
receive an input to correct the display standard.

10. The tracking device according to claim 8, wherein the supplementary information is moving image information in the determined section.

11. The tracking device according to claim 8, wherein the supplementary information includes a number of persons who have passed through the one or more sections.

12. The tracking device according to claim 8, wherein the supplementary information includes sales of products on one or more shelves corresponding to the one or more sections.

13. A tracking method comprising:
acquiring tracking information regarding a tracking indicating a movement of a person in a monitoring region;
determining one or more feature points on the tracking in the monitoring region based on the tracking information;
determining one or more candidate sections of the tracking by connecting adjacent feature points determined;
deleting at least one candidate section through which no tracking passes; and
analyzing the tracking information for each determined section remaining candidate section.

14. A tracking system comprising:
a memory storing instructions; and
one or more processors configured to execute the instructions to:
acquire tracking information regarding a tracking indicating a movement of a person in a monitoring region;
determine one or more feature points on the tracking in the monitoring region based on the tracking information;
determine one or more candidate sections of the tracking by connecting adjacent feature points determined;
delete at least one candidate section through which no tracking passes;
analyze the tracking information for each remaining candidate section of; and
display an analysis result of the tracking information.

15. The tracking system according to claim 14, wherein the one or more processors are further configured to execute the instructions to:
receive an input of information regarding the feature point and;
display the information regarding the feature point input and information regarding the feature point determined.

16. The tracking system according to claim 14, wherein the one or more processors are further configured to execute the instructions to:
receive an input of information regarding the feature point; and
change the feature point based on the information regarding the feature point input; and
display information regarding the feature point changed.

17. The tracking system according to claim 14, wherein the one or more processors are further configured to execute the instructions to:
display image generated by using the analysis result.

18. The tracking device system according to claim 14, wherein the one or more processors are further configured to execute the instructions to:
determine a display standard regarding whether or not to output the analysis result based on the analysis result including a number of trackings passing through the remaining candidate section;
determine a section that satisfies the display standard;
generate supplementary information in the determined section; and
display the image including the generated supplementary information.

* * * * *